3,037,743
CHAIN TIGHTENER
Carl S. Benchley, Malvern, Ohio
Filed Aug. 17, 1959, Ser. No. 834,324
2 Claims. (Cl. 254—78)

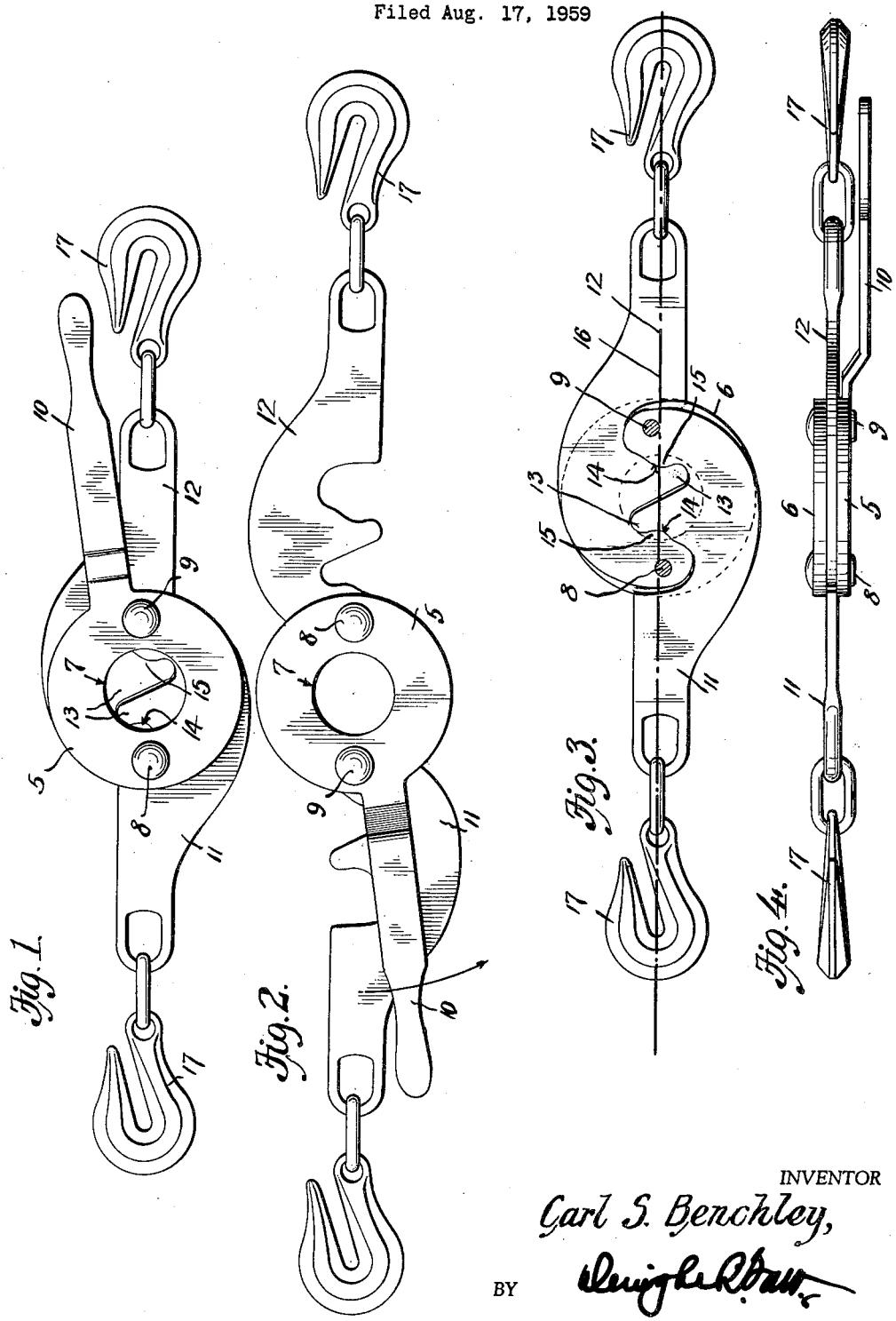

This invention is a chain tightener designed particularly for securing or tying loads on trucks, cars, etc.

The primary object of the invention is to provide means for fastening chain ends about a load with comparative ease and in such manner that the load will be held firmly in tensioned position, the structure being such that the chain ends may be easily relaxed to release the load when desired.

A still further object of the invention is to provide a chain tightener of the character generally stated constructed in such manner that the chain ends may be quickly and easily made fast upon the load in clamping relationship thereon, and which involves such construction that all tendency for the fastener to become accidentally detached, due to jars or vibrations, are overcome.

With the foregoing objects in view, together with others which will appear as the description proceeds, the invention resides in the novel construction, combination and arrangement of parts, all as will be described more fully hereinafter, illustrated in the drawings, and particularly pointed out in the claims.

In the drawings:

FIG. 1 is a side elevation of a chain tightener or connector constructed in accordance with my invention and showing the same in the position the parts will assume when the chain ends are connected, FIG. 2 is a view similar to FIG. 1 and showing the parts in the position they will assume when the tightener is "broken" or moved to chain releasing position, FIG. 3 is a view similar to FIG. 1 and showing the outer cover plate removed so as to disclose the interlocking engagement of the parts, and FIG. 4 is a top plan view of the device as shown in FIG. 1.

Referring now more particularly to the drawings, the chain tightening device includes a pair of spaced apart plates 5 and 6, these plates being circular in form and may be cut away at their medial portion as indicated at 7 to lighten the construction. These plates are secured together by rivets 8 and 9 which pass through the plates at substantially diametrical points. One of these plates is provided with a radiating handle 10 so that the plates in unison may be rotated manually.

The locking mechanism resides in a pair of arms 11 and 12 of substantially identical structure. These arms are made of flat metal, straight throughout their lengths, the inner ends of said arms being housed pivotally between the plates 5 and 6 for rotative movement therebetween. These arms radiate from opposite sides of the side plates 5 and 6, and each is pivotally connected to the rivet 8 or 9, as the case may be, opposite to the side of the plate from which the arm projects when the tightener is in closed or locked position. These flat straight arms have the edges of their inner ends provided with interengaging teeth 13, the said teeth engaging in similarly shaped recesses in the opposing arm as will be understood. The teeth 13 are provided in one face with a recess 14 to receive a projection or protuberance 15 in the adjacent tooth surface, so that interlocking engagement between the teeth occurs when these surfaces are brought together as shown in FIG. 3 of the drawing. It will be noted in FIG. 3 that when the teeth are in interengaged or locked position, the arms 11—12 are in true alignment with one another and the line of draft indicated at 16 is off center from these pivots. Moreover, it will be observed that the line of draft 16 passes through the interengaged recesses and projections 14—15 of the teeth. It will also be observed, particularly with reference to FIG. 3, that there is slight play between the teeth in the line of draft to permit the recesses and projections 14 and 15 of the teeth to disengage from one another when it is desired to "break" the interlocking engagement. The outer ends of the arms 11—12 have connected thereto hooks 17 or other devices to enable the chain ends to be readily attached to the oppositely extending arms.

When it is desired to attach the hooks 17 to the chain ends to be bound about the load, the lever 10 will be moved to the position illustrated in FIG. 2 of the drawings which is the "release" position. When the hooks 17 are engaged with the chain ends, the lever 10 will be swung in counterclockwise direction as indicated by the arrow in FIG. 2, whereupon the plates 5—6 as a unit move in a circular course, drawing inwardly on the arms 11—12 with which they are connected until they assume the position shown in FIGS. 1 and 3 with the teeth 13 engaged with one another and the projections 15 seated in the recesses 14 and with the rivets 8—9 out of alignment with one another as shown in FIG. 3. The chain is thus tightly bound upon the load and the interengaging teeth with the locking portions 14—15 in engagement with one another prevent the arm ends moving accidentally to such position as will overcome the dead center of the line of draft. When it is desired to "break" the connection or release the load, it is but necessary for the operator to grasp the handle 10 and move it in clockwise direction; the play between the interlocking teeth permitting this readily to be done, whereupon the dead center is overcome and the parts will move to the position shown in FIG. 2 of the drawings.

The chain tightener of my invention is extremely simple in its construction, is composed of a minimum of parts all made of metal of comparatively light weight yet amply sufficient to withstand the stresses and strains to which it will be subjected in use. The parts are easy of assemblage and will prove positive in their operation, yet the structure is of such character that extreme pressures may be brought to bear on the chain ends with a minimum of human effort.

Due to the slight play between the interlocking inner ends of the arms, the teeth of these arms tightly bind and engage with one another when the lever is moved to "locked" position. Therefore, all strains due to the tension of the chains will be borne entirely by the arms and the connecting rivets 8—9 will thus be relieved of these stresses.

I claim:

1. A chain tightening device comprising a pair of spaced apart annular plates of identical diameter, a pair of straight flat arms having their inner ends disposed between said plates at diametrically opposite points therein, a pair of rivets extending through and connecting said plates and pivotally supporting said inner ends, each of said arms having one edge provided with spaced apart teeth to engage in loose locking relationship when the plates are rotated substantially 180 degrees in one direction and to break said engagement when rotated in the opposite direction, said teeth extending across a straight line diametrically of said plates on opposite sides of said pivots when the arms are in locked engagement, the said teeth having engaging faces provided with interfitting projections and recesses disposed in said line when the arms are in locked position, a handle secured to and projecting radially from one of said plates for rotating the same, and means at the outer ends of said arms to attach a load chain.

2. A chain tightening device comprising a pair of annular plates, a pair of rivets extending through said plates at diametrically opposite points to connect them together in spaced relationship, a pair of straight flat arms having their inner ends disposed between said plates with their outer ends projecting in opposite directions therefrom, the inner ends of said arms pivoted each to one of said rivets, teeth on adjacent edges of said inner ends to engage with one another when the plates have been rotated a predetermined degree to dispose said arms in the line of draft, said teeth provided on contacting faces with projections and recesses interengaged with one another in said line of draft, the rivets being disposed beyond and at positions on opposite sides of said line of draft when said teeth are interengaged, said teeth having play between them to permit said engagement of said projections and recesses, a handle secured to and projecting from one of said plates for rotating said plates as a unit, and means at the outer ends of said arms to attach a load chain.

References Cited in the file of this patent

UNITED STATES PATENTS

| | | |
|---|---|---|
| 1,420,460 | Sullivan | June 20, 1922 |
| 1,606,090 | Masters | Nov. 9, 1926 |
| 1,896,592 | Potter | Feb. 7, 1933 |
| 2,097,048 | Statler | Oct. 26, 1937 |
| 2,309,510 | Jacobowitz | Jan. 26, 1943 |